(12) United States Patent
Frank et al.

(10) Patent No.: US 11,054,676 B2
(45) Date of Patent: Jul. 6, 2021

(54) SAW MODULATORS WITH PHASE AND ANGLE SELECTIVE OPTICAL COATINGS

(71) Applicant: The Charles Stark Draper Laboratory, Inc., Cambridge, MA (US)

(72) Inventors: Ian Ward Frank, Arlington, MA (US); Jeffrey A. Korn, Lexington, MA (US); Steven J. Byrnes, Watertown, MA (US); Dennis M. Callahan, Jr., Wellesley, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 351 days.

(21) Appl. No.: 15/989,437

(22) Filed: May 25, 2018

(65) Prior Publication Data

US 2018/0341127 A1    Nov. 29, 2018

Related U.S. Application Data

(60) Provisional application No. 62/511,111, filed on May 25, 2017.

(51) Int. Cl.
| | |
|---|---|
| *G02F 1/11* | (2006.01) |
| *G02F 1/125* | (2006.01) |
| *G03H 1/22* | (2006.01) |
| *G02F 1/335* | (2006.01) |
| *G03H 1/02* | (2006.01) |

(52) U.S. Cl.
CPC ............... *G02F 1/11* (2013.01); *G02F 1/125* (2013.01); *G02F 1/335* (2013.01); *G03H 1/2294* (2013.01); *G02F 2203/24* (2013.01); *G03H 2001/0224* (2013.01); *G03H 2225/21* (2013.01)

(58) Field of Classification Search
CPC . G02F 1/11; G02F 1/125; G02F 1/335; G02F 2203/24
See application file for complete search history.

(56) References Cited

U.S. PATENT DOCUMENTS

| | | |
|---|---|---|
| 2005/0008294 A1 | 1/2005 | Park et al. |
| 2013/0050788 A1* | 2/2013 | Maeng ................. G03H 1/2294 359/10 |
| 2013/0209026 A1 | 8/2013 | Doany et al. |
| | (Continued) | |

OTHER PUBLICATIONS

Matteo et al., "Collinear Guided Wave to Leaky Wave Acoustooptic Interactions in Proton-Exchanged LiNbO3 Waveguides", IEEE Trans Ultrasonics, Ferroelec. and Freq. Contrl., vol. 47, No. 1, Jan. 2000 (Jan. 2000 ), pp. 16-28.*

(Continued)

*Primary Examiner* — Joseph P Martinez
(74) *Attorney, Agent, or Firm* — HoustonHogle LLP

(57) ABSTRACT

A system and method for improving spatial light modulator (SLM) devices such as Surface Acoustic Wave (SAW) modulators are disclosed. The SAW modulators can improved angular bandwidth and suppress unwanted diffractive orders. In one example, a coating layer(s) is applied to a proximal face of the SAW modulator to improve coupling of guided modes into leaky modes. Additionally, applying coating layers(s) such as a hybrid anti-reflective/highly reflective coating to an exit face of the SAW modulator can suppress transmission of undesired diffractive order(s).

20 Claims, 15 Drawing Sheets

(56) References Cited

U.S. PATENT DOCUMENTS

2014/0300694 A1 10/2014 Smalley et al.

OTHER PUBLICATIONS

Hu, J., et al., "Understanding leaky modes: slab waveguide revisited," Advances in Optics and Photonics, 1: 58-106 (2009).

Matteo, M., et al., "Collinear Guided Wave to Leaky Wave Acoustooptic Interactions in Proton-Exchanged LiNbO3 Waveguides," IEEE Trans Ultrasonics, Ferroelec. and Freq. Contrl., 47(1), 16-28 (2000).

McLaughlin, S., et al., "Optimized guided-to-leaky-mode device for graphics processing unit controlled frequency division of color," Applied Optics, 54(12): 3732-3736 (2015).

Qaderi, K., et al., "Paired leaky mode spatial light modulators with a 28° total deflection angle," Optics Letters, 42(7): 1-5 (2017).

Savidis, N., et al., "Progress in fabrication of waveguide spatial light modulators via femtosecond laser micromachining," Optics and Photonics X, 101150R (2017).

Smalley, D.E., et al., "Progress on Characterization and Optimization of Leaky-Mode Modulators for Holographic Video," Journal of Micro/Nanolithography, MEMS, and MOEMS, 14(4), 041308-1-041308-6, (Oct.-Dec. 2015).

International Search Report and Written Opinion of the International Searching Authority, dated Oct. 23, 2018, from International Application No. PCT/US2018/034570, filed on May 25, 2018. 19 pages.

Partial Search Report of the International Searching Authority, dated Aug. 31, 2018, from International Application No. PCT/US2018/034570, filed on May 25, 2018. 13 pages.

Santos, P.V., "Collinear Light Modulation by Surface Acoustic Waves in Laterally Structured Semiconductors," J. App. Physics, 89(9): 5060-5066 (2001).

* cited by examiner

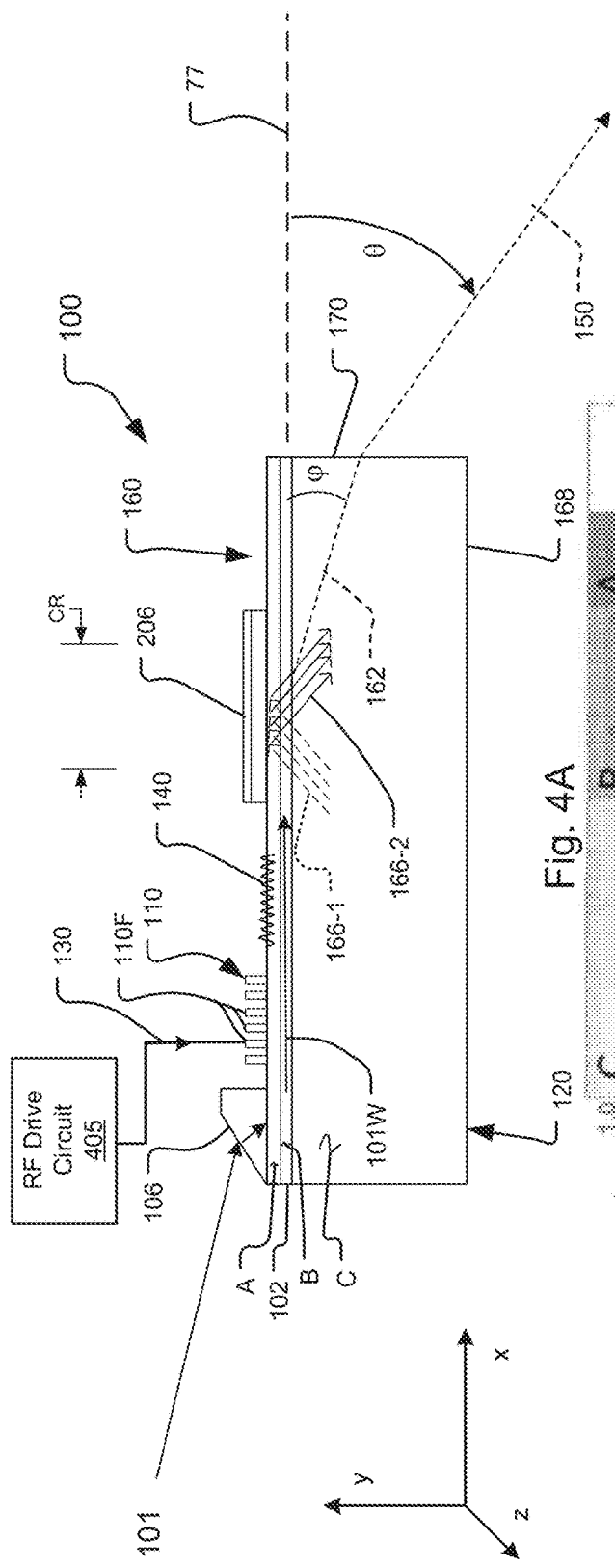
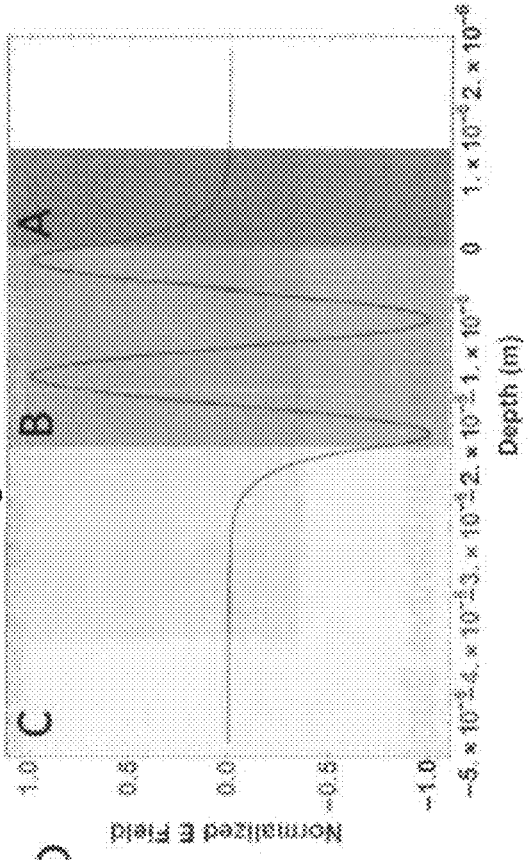
Fig. 4A
Fig. 4B

SAW MODULATORS WITH PHASE AND ANGLE SELECTIVE OPTICAL COATINGS

RELATED APPLICATIONS

This application claims the benefit under 35 USC 119(e) of U.S. Provisional Application No. 62/511,111, filed on May 25, 2017, which is incorporated herein by reference in its entirety.

BACKGROUND OF THE INVENTION

Currently proposed autostereoscopic (naked-eye) 3D displays and, more broadly, light field generator architectures employ a variety of scanning, diffraction, space-multiplexing, steered illumination, and other techniques. One category, electro-holographic displays, relies principally on diffractive phenomena to shape and steer light. Electro-holographic light field generators hold the promise of projecting imagery with the ultimate in realism: curved optical wavefronts, which can genuinely replicate the real world. Such displays can theoretically provide nearly perfect characteristics of visual depth information, color rendering, optical resolution, and smooth transitions as the viewer changes their location. So far, displays built on this technology have not achieved this theoretical level of performance, however.

One specific device category that provides controllable sub-holograms from which a light field can be constructed uses what are known as surface acoustic wave (SAW) modulators. In these devices, a SAW is generated in a piezoelectric substrate under radio frequency (RF) excitation. This creates a time-varying diffracting region that interacts with light in waveguides formed in the substrate. In leaky mode SAW modulators, the SAW causes at least some of the light to be diffracted and change from a guided mode within the waveguides to a leaky mode that exits the waveguides at some deflection angle. Broadly speaking, this deflection angle is a function of the wavelength of the light and the wavelength of the SAW.

SUMMARY OF THE INVENTION

One problem of some existing SAW modulators relates to the addressable deflection angles for the leaky mode light. In practice, existing SAW modulator only allow for efficient coupling of light into certain ranges of deflection angles. This is a consequence of inefficient mode overlap between the guided modes and the leaky modes that correspond to different angles. Additionally, multiple diffractive orders of the leaky modes can emerge when only one is desired. Finally, when multiple guided modes of the same wavelength are excited in the SAW modulators' waveguides, interference and/or crosstalk among the guided modes can also limit the ranges of useful deflection angles. These limitations can decrease the useful angular bandwidth, or exit angle fan, of the exit light emitted from existing SAW modulators and/or the amplitude of that light across the exit angle fan and/or the existance of stray light.

The present invention concerns a spatial light modulator and a method of its operation that increases the coupling from a guided mode into a leaky mode. The increase in coupling can be over a broader exit angle fan and/or with less variability in the efficiency over that range of that fan.

For this purpose, in one example, one or more coating layers are applied to the proximal faces of SAW modulators to improve the coupling into the leaky modes. To understand the operatic of the coating layers, the leaky mode is characterized as a standing wave formed by the interference between a plane wave incident on the top-face and its reflection, obeying the laws of Fresnel reflection. These modes are a continuous family of modes and can be defined for any frequency of electromagnetic radiation. The "angle-in equals the angle out" law of reflection implies that the angle with respect to the normal of the top-face of the modulators provides a natural basis for the description of such leaky modes.

The proximal coating layer(s) are tailored to adjust the phase shift due to the reflection that more of the incoming plane waves experience by the one or more coating layers. The resulting adjustments in the standing wave improve constructive interference among the plane waves at the location where the interaction with the guided mode is strongest.

In another example, an exit face coating layer such as a hybrid anti-reflective/highly-reflective (AR/HR) coating layer is applied to an exit face of the SAW modulator. This exit face might be the end face, distal face, or proximal face, for example. The exit face coating layer allows diffracted, leaky mode light of a desired diffractive order of the guided mode to be transmitted with little variation over the range of exit angles, while also suppressing transmission of unwanted diffractive order(s).

In general, according to one aspect, the invention features a surface acoustic wave (SAW) modulator. It includes a SAW substrate, a waveguide in the SAW substrate, and one or more coating layers that are applied to a face of the SAW substrate to improve coupling of guided modes of the waveguide into leaky modes.

In embodiments, the one or more coating layers adjust a phase of one or more plane waves forming the leaky modes to improve or maximize coupling of the guided modes to the leaky modes over a range of angles.

These one or more coating layers can be applied to a proximal face of the SAW substrate, or an end or exit face of the SAW substrate.

The one or more coating layers can be reflective layers or transmissive layers.

The coating layers might include at least one metal layer and/or a multilayer thin film dielectric coating.

In embodiments, the waveguide is a buried waveguide. Moreover, coating layers can be applied to both an proximal face and an end face of the SAW substrate.

In general, according to another aspect, the invention features a multichannel surface acoustic wave (SAW) modulator. It includes a SAW substrate, two or more waveguides in the SAW substrate, and different coating layers applied to a face of the SAW substrate for each of the waveguides to improve coupling of guided modes of the waveguide into leaky modes.

In general, according to another aspect, the invention features a method for fabricating a surface acoustic wave (SAW) modulator. This method comprises forming a waveguide in a SAW substrate and depositing one or more coating layers to a face of the SAW substrate to improve coupling of guided modes of the waveguide into leaky modes.

In general, according to another aspect, the invention features a surface acoustic wave (SAW) modulator. The modulator includes a SAW substrate, a waveguide in the SAW substrate, and a coating layer applied to an exit face that suppresses transmission of one or more unwanted diffractive orders.

Preferably, this coating layer is an anti-reflective/highly-reflective (AR/HR) coating.

In general, according to another aspect, the invention features a multichannel surface acoustic wave (SAW) modulator. It includes a SAW substrate, two or more waveguides in the SAW substrate, and one or more coating layers applied to an exit face of the SAW substrate to suppress transmission of one or more unwanted diffractive orders.

In general, according to another aspect, the invention features a surface acoustic wave (SAW) modulator. The modulator includes a SAW substrate, a waveguide in the SAW substrate, and a switching system that selective excites different guided modes of the waveguide.

In general, according to still another aspect, the invention features a method of operation of a surface acoustic wave (SAW) modulator. The method comprises determining a desired output angle and exciting a guided mode of a waveguide in the SAW modulator that can address the desired output angle.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4A is a schematic side view of an exemplary SAW modulator having a "buried" waveguide;

FIG. 4B is a an electric field plot for a guided mode in the SAW modulator of FIG. 4A;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
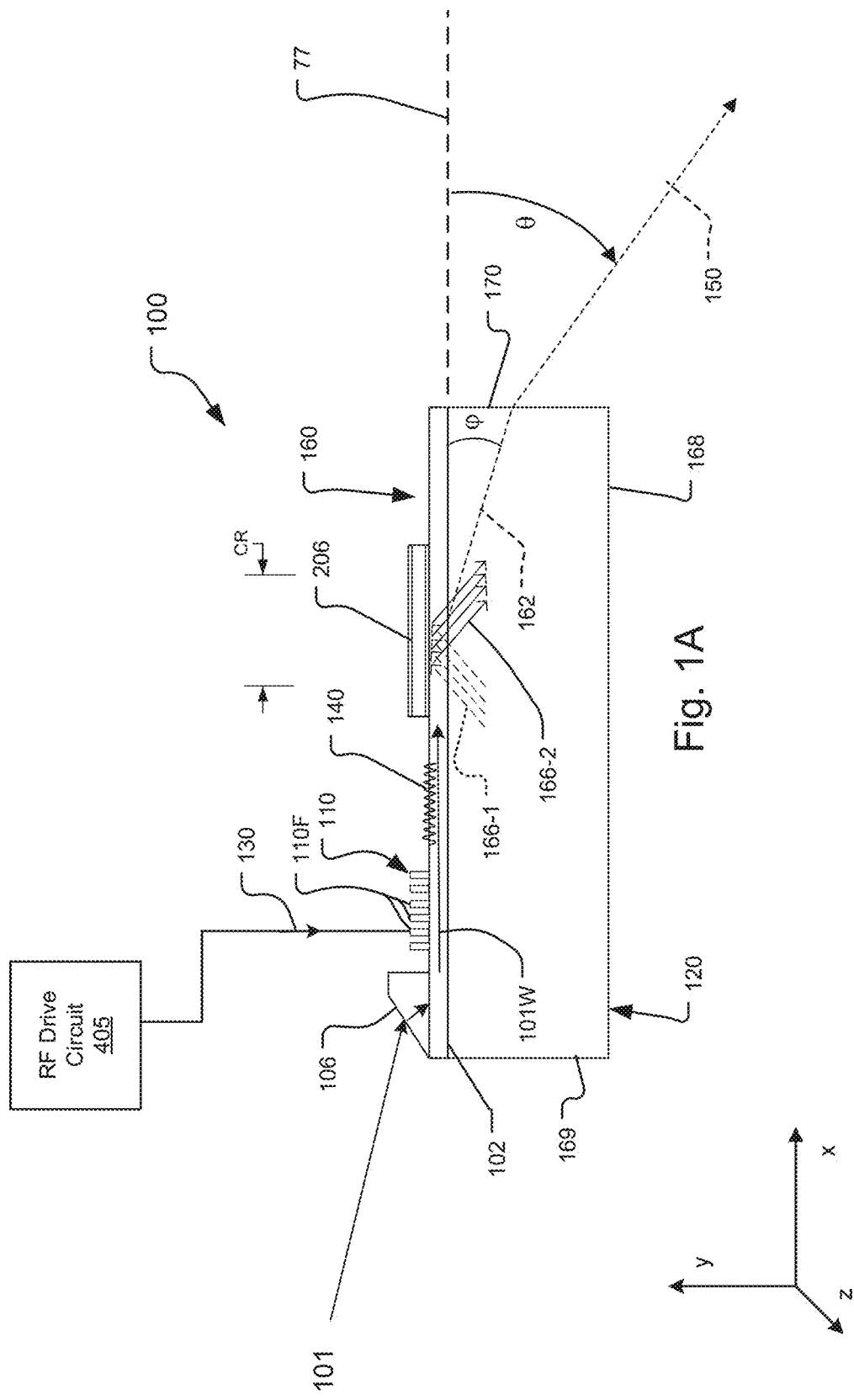
FIG. 1A is a schematic side view of an exemplary SAW modulator including a coating layer that adjusts/matches the phase of plane waves that form the leaky mode.

FIG. 1A shows an exemplary surface acoustic wave (SAW) modulator 100 that uses one or more coating layers 206 to improve coupling of guided modes of the modulator's waveguide 102 into leaky optical modes.

In more detail, the SAW modulator 100 comprises a SAW substrate 120. The substrate 120 is piezoelectric. Commonly lithium niobate is used. Other options are quartz ($SiO_2$), or lithium tantalate (LiTaO3). The substrate 120 may range in x- or y-dimensions of 1 centimeters (cm) (for near-eye display applications) to over 20 cm (for larger displays at larger viewing distances). Typically the thickness (y-dimension) of the optical substrate 120 ranges from 0.5 millimeters (mm) to 3 mm.

A waveguide 102 is formed in the SAW substrate 120. A common example is a slab waveguide formed by proton-exchange. The waveguide can be planar, ridge, rib, embedded, immersed, and bulged. Often, the waveguide 102 is formed in the substrate by doping, such as MgO-doped lithium niobate.

In general, these SAW materials exhibit a birefringence property that allows for the convenient conversion of waveguided-light 101W from the guided modes of the waveguide 102 into leaky modes that exit the waveguide 102. The materials also enable convenient polarization-based filtering of scattered light.

Input light 101 is coupled into the waveguide 102. An in-coupling device 106 is typically used to couple the input light 101, possibly carried in an optical fiber or propagating in freespace. Examples of in-coupling devices 106 include in-coupling prisms, gratings, or simply butt-coupling to an optical fiber. The input light 101 is launched into the waveguide and excites one or more guided modes upon entry into the waveguide 102. Commonly in these devices, the TE (transverse electric) mode characterizes the guided modes.

One or more transducers 110, e.g., interdigital transducers or IDTs, are formed on a proximal face 160 of the substrate 120. The transducers 110 are typically a patterned metal (aluminum) layer that receives drive signals 130 from an RF drive circuit 405. Titanium, gold, conductive polymers, or conductive oxides such as indium tin oxide (ITO) can also be used. Patterning the SAW transducers may be performed through photolithography (etching or lift-off), laser ablation of metal film, or direct-writing techniques.

When driven, the transducers 110 induce SAWs 140 in the substrate. The SAWs 140 propagate along the waveguide 102. In different embodiments, the SAW transducers 110 can occupy a variety of specific locations and specific orientations with respect to their respective waveguide 102. In the illustrated embodiment, the SAW transducers 110 are located proximate to the near end of the waveguide 102, near the in-coupling devices 106. Thus, the SAWs 140 will propagate with the direction of light propagation in the waveguide 102. Further, there could be multiple SAW transducers 110 for each waveguide 102, with each SAW transducer 110 responsible for a different specific bandwidth around a given center frequency (e.g., 100-200 MHz, 200-300 MHz, and 300-400 MHz).

In other examples, the SAW transducers 110 might be located at the opposite, far end of the waveguide 102 from the in-coupling device 106. Thus, the SAWs counter-propagate, in a direction opposite the propagation of the light in the waveguides 102.

The IDT SAW transducers 110 are designed based on the desired SAW parameters. The center to center distance between adjacent fingers of the IDT is known as the pitch of the IDT. The pitch of the IDT is typically about half of the wavelength of the SAW produced by the IDT. A typical IDT has 50-100 fingers in it, about 1-2 micrometers wide per finger. The SAW 140 is the sum of waves formed by the fingers of the IDT 110. The SAW signals travel down the waveguide 102 with and/or contradirectional to the light.

In operation, the light 101W in the waveguide 102 interacts with the SAW wave 140. The result of this interaction is that a portion of the guided light is diffracted and polarization-rotated, out of the guided mode and into a leaky mode having the transverse magnetic (TM) polarization. The light then exits the waveguide 102 as leaky-mode or diffracted light 162 and enters the bulk substrate 120 at deflection angle φ, measured from grazing 77. At some point this diffracted light 162 exits the substrate 120 at an exit face, which is possibly through the substrate's distal face 168, proximal face 160, or end face 170 (as shown) as exit light 150 at an exit angle of θ. The range of possible exit angles θ comprises the angular extent, or exit angle fan, of the exit light 150. In typically SAW modulators, exit angle θ varies between about 0 to 40 degrees and is dependent on the SAW frequency (frequency of the RF drive signal 130) and the wavelength (frequency) of the waveguide light 101W.

To excite a range of wavelengths required to make a useful radiation shaping system, such as a holographic display system, from the exit light 150, a chirped or composite IDT 120 is often used with multiple finger pitches. The IDT will have a maximum frequency at which it can be efficiently driven as determined by its geometry and the electromechanical coupling with the underlying substrate material of the SAW device. This will lead to a minimum achievable SAW wavelength, and corresponding maximum output deflection angle φ and field of view of the exit light emitted from the SAW modulator 100.

Current approaches to SAW modulator design typically consider the diffracted light of the leaky modes to be a fixed parameter of the waveguide 102 for a given geometry and wavelength of the waveguide light 101W. For this purpose, in one example, the usual method is to search the parameter space of the waveguide geometry for a combination of guided mode and leaky mode with the best overlap, whereby the best overlap results in the highest efficiency of coupling the energy from the guided to the leaky mode.

The optical fields overlap with the piezoelectric and electrooptic changes in the permitivitty matrix according to an overlap integral. The overlap integral for guided to leaky mode coupling efficiency has 3 terms: 1) guided mode field, 2) leaky mode field, and 3) delta epsilon or change in the dielectric permittivity matrix as induced by the SAW 140. Without this, even with a perfect optical mode overlap there would be no coupling.

Researchers typically also optimize the waveguide depth in order to correspondingly increase the range and/or efficiency of the diffraction angles. However, there are significant limitations to this approach based on the waveguide geometry, material choices, and wavelength of the light signals of the light source. See D. E. Smalley, S. McLaughlin, C. Leach, J. Kimball, V. M. Bove, and S. Jolly, "Progress on Characterization and Optimization of Leaky-Mode Modulators for Holographic Video," Journal of Micro/Nanolithography, MEMS, and MOEMS, 14(4), 041308, (October-December 2015), with emphasis on FIG. 6 and FIG. 7 of that reference.

However, this design approach misses a key point concerning the nature of the leaky modes. The disclosed system takes advantage of the fact that a leaky mode can be described as a broad frequency range continuum that has some non-zero overlap integral with a combination of the guided mode 102 and refractive index perturbation, in this instance created by the SAW 140, of the substrate 120 of the SAW modulator 100, using coupled mode theory.

With respect to SAW modulators, the coupled mode theory reveals that the efficiency at each deflection angle is based on a combination of factors: an overlap integral between the electric field of the guided mode of the waveguide light 101W, the profile of the refractive index perturbation of the substrate, where part of this index perturbation is induced by the SAW 140, and the electric field of each leaky mode.

Applying coupled mode theory to the illustrated example, the leaky modes can be modeled as a sum of plane waves. Plane waves are waves whose wave fronts (surfaces of constant phase) are infinite parallel planes. The plane waves form a complete basis for describing the spatial character of any electromagnetic radiation in linear media. However, in the case of beam deflectors such as SAW modulators, modeling the leaky modes as plane waves is especially advantageous, as the effect being sought is deflection at a specified angle in the far field, which is naturally described as a plane wave. See, for example, J. Hu and C. R. Menyuk, "Understanding leaky modes: slab waveguide revisited," Advances in Optics and Photonics, 1, 58-106 (2009).

The connection between the leaky modes and plane waves can be realized by recognizing that each leaky mode can be defined by two significant families of coexistent plane waves, a downward deflected plane wave and an upward deflected plane wave. In the illustrated example, the upward deflected plane wave and the downward deflected plane wave are represented by arrows 166-1 and 166-2, respectively, which are each pointed in a direction that is perpendicular to the wavefront of the plane waves.

The waveguide light 101W couples into each of the plane waves 166-1 and 166-2 equally. The upward deflected plane wave 166-1, however, experiences a reflection at the substrate-air boundary at the proximal face 160 of the substrate 120, and therefore interferes with the downward deflected waves 166-2, thus forming a standing wave. The diffracted light 162 and thus the exit light 150 can then be observed at angles φ, θ where constructive interference among the plane waves 166-1 and 166-2 occurs.

The leaky mode or diffracted light 162 can be expressed as $$E \propto e^{[ik[\cos(\theta)\hat{x} - \sin(\theta)\hat{y}] + e^{[-ik(\cos(\theta)\hat{x} + \sin(\theta)\hat{y}) + i\varphi(\theta)]}}$$

where E is a component of the electric field (x, y, or z, depending on polarization and sign conventions), e is Euler's constant, $\hat{x}$ and $\hat{y}$ are the unit vectors of the coordinates as marked in FIG. 1A, i is the imaginary unit, k is the angular wavenumber of a plane wave in the material, theta θ is the downward angle 204 from the x direction (i.e. from the initial light direction 102, measured clockwise) and $\varphi(\theta)$ is the phase shift from reflection at the material-air boundary. This interaction is constrained by the geometry and the phase relationship inherent in the Fresnel coefficients at the substrate material-air boundary.

Depending on the waveform of the SAWs 140 and the speed of sound in the material of the substrate 120, the perturbation at the substrate-air boundary of the proximal face 160 will have certain spatial frequencies. The spatial frequencies will define the angles at which the diffracted light will be deflected away from the proximal face 160. The diffracted light 162 coupled out of the guided mode in the waveguide 102 can then propagate away from the waveguide and into the bulk of the substrate 120. These deflection angles φ are defined by the so-called Bragg condition.

Another method for altering profiles of the leaky modes involves burying the waveguide 102 far away from the substrate-air boundary at the proximal face 160. This results in a waveguide 102 having a symmetric material above and below it, which will remove the coupling between the upward traveling (166-1) and downward traveling (166-2) plane waves. While this removes the possibility of their destructive interference, it also has the effect of reducing the maximum possible efficiency, as the constructive interference is also removed.

Yet another method for altering profiles of the leaky modes or diffracted light 162 would be to "frustrate" the total-internal reflection within the waveguide 48 at the substrate-air boundary at the proximal face 160. This can be accomplished, in one example, by placing a dielectric with a higher index of refraction within the evanescent field of the totally internally reflected wave allowing it to propagate away. This will have similar advantages and disadvantages as the symmetric waveguide solution proposed in the immediately preceding paragraph.

Figure 2:
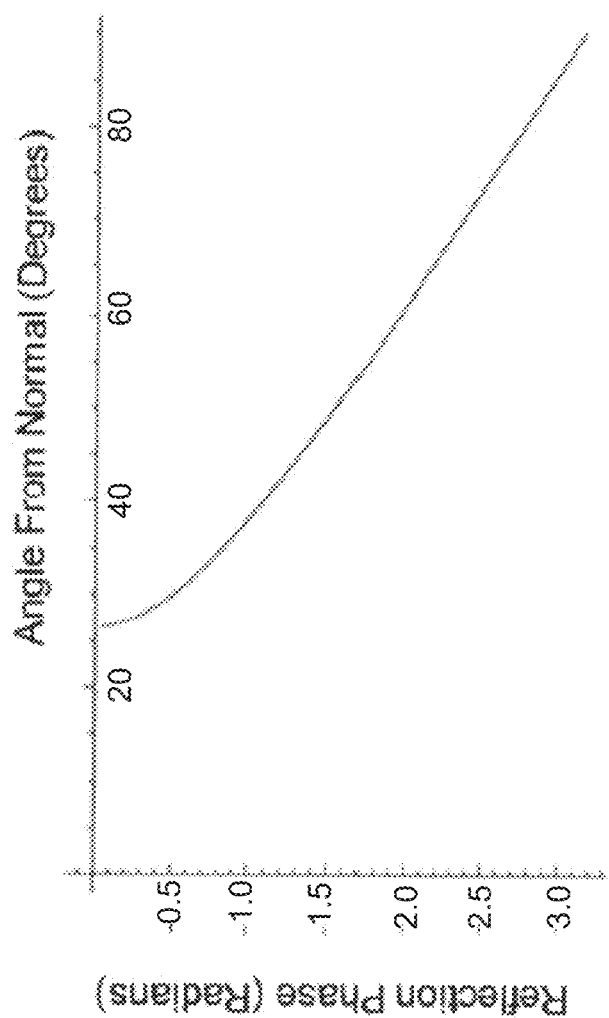
FIG. 2 is a plot of the reflection phase measured in radians experienced by a plane wave forming the leaky mode of a typical SAW modulator, where the reflection phase is a function of incidence angle of the leaky mode, in degrees.

FIG. 2 is a plot of the reflection phase of a leaky mode of a typical existing SAW modulator at a substrate-air boundary. The reflection phase is a function of angle of the leaky mode, here measured from the normal of the proximal face 160.

However, using optical techniques known in the art including multi-layer dielectric stacks, or metallic layers, it is straight-forward to apply virtually arbitrary phase relationships as a function of incidence angle from reflections at this proximal face boundary. As a result, an appropriate optical coating 206 is applied to the proximal face 160 of the substrate 120 of the SAW modulator 100. It is designed to modify the phase of the constituent plane waves 166-1, 166-2 that make up the diffracted light 162. This optimizes the resulting angular bandwidth and light across the exit angle fan, without altering the rest of the waveguide geometry.

In more detail, returning to FIG. 1A, one or more coating layers 206 are applied to the proximal face 160 of the SAW modulator 100 to optimize the spatial pattern of the constructive interference between the plane waves 166-1/166-2 of the leaky mode diffracted light. The coating layer(s) 206 are applied at a location along the waveguide 102 where deflections of the upwardly traveling plane waves 166-1 of the leaky mode occur. The coating layer(s) 206 are tailored to adjust the phase of the plane waves 166, which correspondingly adjusts the wave shape of the leaky mode for a fixed waveguide geometry. This, in turn, can provide the optimal spatial profile for constructive interference between the plane waves 166-1/166-2 of the leaky mode diffracted light 162.

In one example, the coating layer(s) 206 can be applied only to a conversion region CR, in which the one or more guided optical modes of the waveguide light 101W are converted into the diffracted light 162. This conversion region CR is defined relative to the proximal face 160 of the substrate 120, partway between the input face 169 and the end face 170.

Figure 1B:
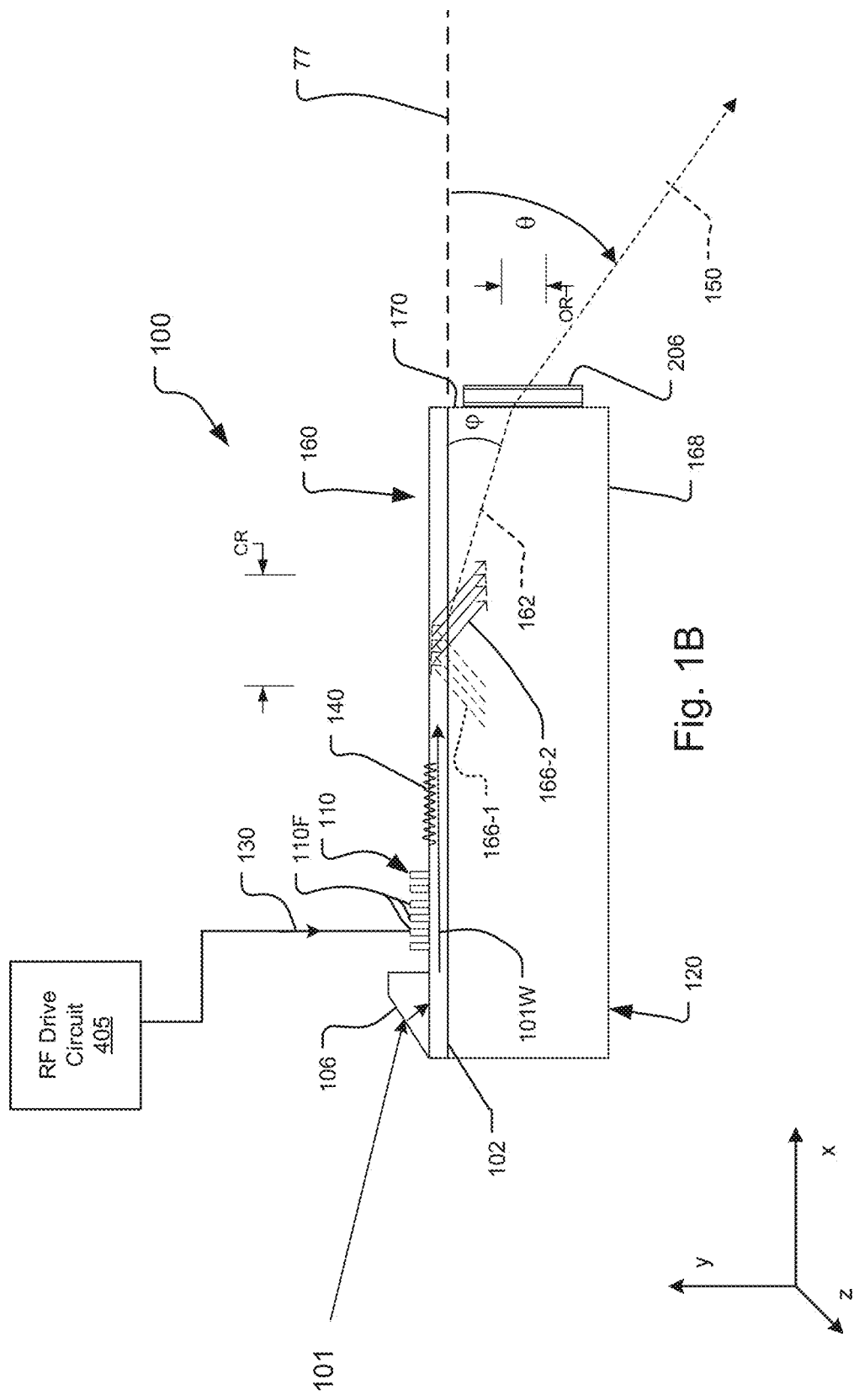
FIG. 1B is a schematic side view of an exemplary SAW modulator including an exit face coating layer that adjusts/matches the phase of plane waves that form the leaky mode.

As shown in FIG. 1B, in another example, the coating layer(s) 206 is applied to an outcoupling region OR in which the diffracted light 162 transitions to exit light 150 and from inside the substrate 120 and then out into free space for subsequent manipulation or viewing. This outcoupling region OR is on the exit face, which is the endface 170 in the illustrated embodiment.

In other examples, the exit face is the distal face 168 and the coating 206 is applied to the distal face 168.

The coating layer 206 and its parameters are chosen according to the required function from a broad range of coating materials and geometries developed in the field of optical coating. For example, two or more thin film dielectric coating layers 206 are applied to form a multilayer stack, such as in a Quarter-Half-Quarter configuration that can lead to a broad-band and broad-angle coating. In other examples, the coating layer 206 can include layers of electrically conductive/reflective materials such as metals and semi conductive materials.

The design method to compute the correct phase profile for the coating layer(s) 206 to achieve optimal constructive interference of the leaky modes of the diffracted light of the SAW modulator 100 is based on a numerical computation that requires several factors. These factors include the refractive index profile of the waveguide 102, the choice of guided mode of the waveguide 102 that is excited, and the profile of refractive index perturbation. Given these design inputs parameters, a numerical optimization of the overlap integral between the three values is executed. See, for example, M. Matteo, C. S. Tsai, and N. Do, "Collinear Guided Wave to Leaky Wave Acoustooptic Interactions in Proton-Exchanged LiNbO3 Waveguides," IEEE Trans Ultrasonics, Ferroelec. and Freq. Contrl., 47(L), L6-28 (January 2000).

Despite the numerical nature of the optimization a qualitative physical description of the general problem is provided. As previously stated the goal is to maximize the overlap integral between the leaky mode, the guided mode, and the refractive index perturbation. As the deflection angle varies, note three things in particular: the guided mode remains constant, the refractive index perturbation varies slowly enough to be treated as quasi-static, and the leaky mode varies quickly. The purpose of the top-coating 206 can be thought of as stabilizing the leaky mode profile. Effectively, as the deflection angle from the surface increases, the nodes in the standing wave profile come closer together and their contribution to the overlap integral trends to average to zero. Therefore the goal of the top coating 206 is to cause the reflection phase of the light to vary such that the standing wave profile is never allowed to reach the point where the total contribution drops to zero. This change in the reflection phase can be viewed as shifting the plane of the reflection. With no top-coating this plane of reflection is dictated by the Goos-Hänschen shift, however, the multilayer coating 206 allows for this plane to be set at the most advantageous height above the top-face.

The diffracted light of the leaky modes 162 can then be coupled out of the SAW modulator 100 through the exit face, as exit light 150. The exit light 150 collectively forms a "fan" of light such as a hologram, in one example. Because the coating layer(s) 206 can enable more efficient coupling into the leaky modes, the SAW modulator 100 as illustrated can correspondingly provide increased ranges for the exit light angle θ compared to existing SAW modulators.

Figure 3:
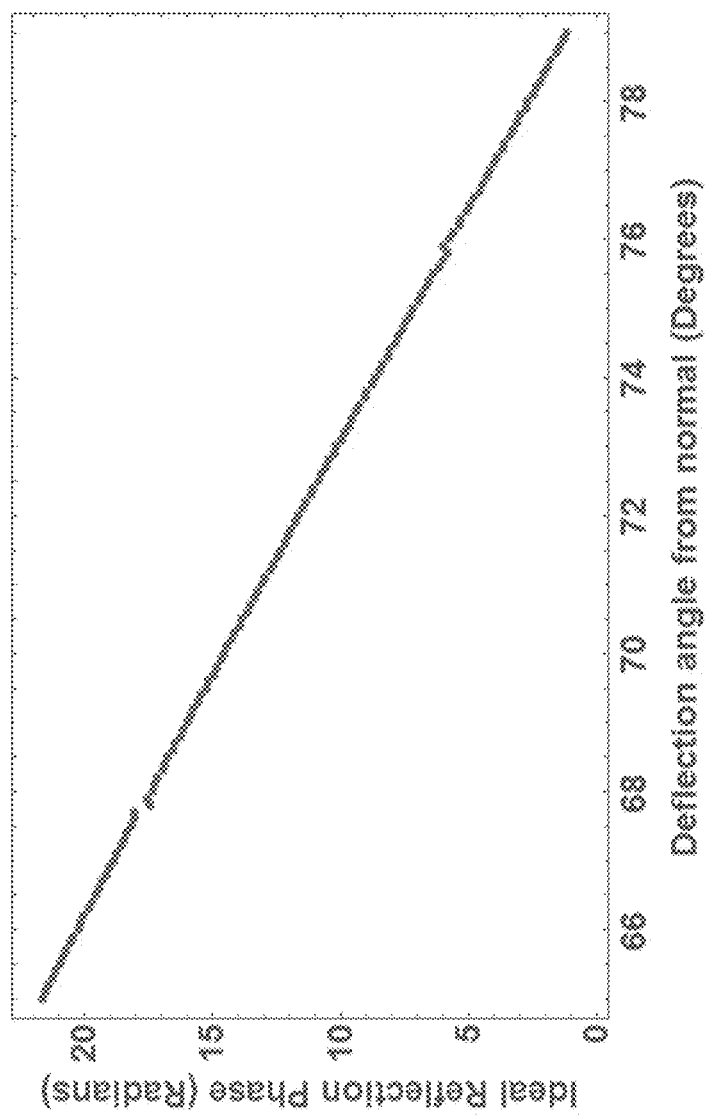
FIG. 3 is a plot of reflection phase in radians versus deflection angle of a leaky mode in degrees for a SAW device having a coating layer as described herein.

FIG. 3 is a plot of reflection phase versus deflection angle of a leaky mode diffracted light for a SAW modulator 100 having a coating layer 206 as described in connection with FIG. 1A. The ideal reflection phase is plotted as a function of deflection from normal to the proximal face 160, in degrees. The effect of the different phase profiles can be viewed in FIGS. 12A and 12B.

In the plot, the ideal phase over a limited portion of the possible deflected angles is shown. In general, an optimization can be performed over all possible deflection angles. However, the ideal phase profile may become difficult to reproduce with a physical coating due to such features as discontinuities. By confining to a small region around the natural maximum, a linear relationship, as shown in FIG. 3, results and is straightforward to design a coating replicating this profile.

FIG. 4A shows a SAW modulator having "buried" waveguide 102.

In more detail, a buried waveguide 102 geometry is depicted. Areas A and C of the SAW substrate above and below the waveguide 102, respectively, are constructed from pure lithium niobate. Area A has an ordinary refractive index of n–o=2.2864 (the refractive index experienced by light polarized in the plane of the image), and area C has an extra-ordinary refractive index of n–e=2.2022 (the refractive index experience by light polarized perpendicular to the plane of the image). Both of these values are selected for light with a wavelength of 633 nm.

Area B characterizes the waveguide 102 and is a proton-exchanged area of lithium niobate where the Li atoms have been replaced with H atoms. This area has refractive indices of n–o=2.24 and n–e=2.32 at the same wavelength of light. Choosing area A to have a height (in the y-axis direction) of 1 micrometer, and area B to have a height of 2 micrometers, we can now calculate the guided modes 101W, and the leaky-modes of the geometry. Due to the buried nature of the waveguide 102, the guided mode 101W has little amplitude at the proximal face 160 of the substrate 120 of the SAW modulator 100. This allows placement/depositing of one or more layered thin-film coatings 206 at that face without affecting the guided mode 102.

FIG. 4B is a plot of the electric field component for a guided mode that propagates in the waveguide 102 of the SAW modulator 100 of FIG. 4A. Each of the areas A-C has a different depth profile. The depth is set to zero at the A-B interface. The normalized electric (E) field of the guided mode is plotted as a function of depth within the SAW modulator 100. The waveguide is treated as a planar waveguide, a condition approached when the depth of the waveguide into the substrate is much greater than the wavelength of the light.

Figure 5:
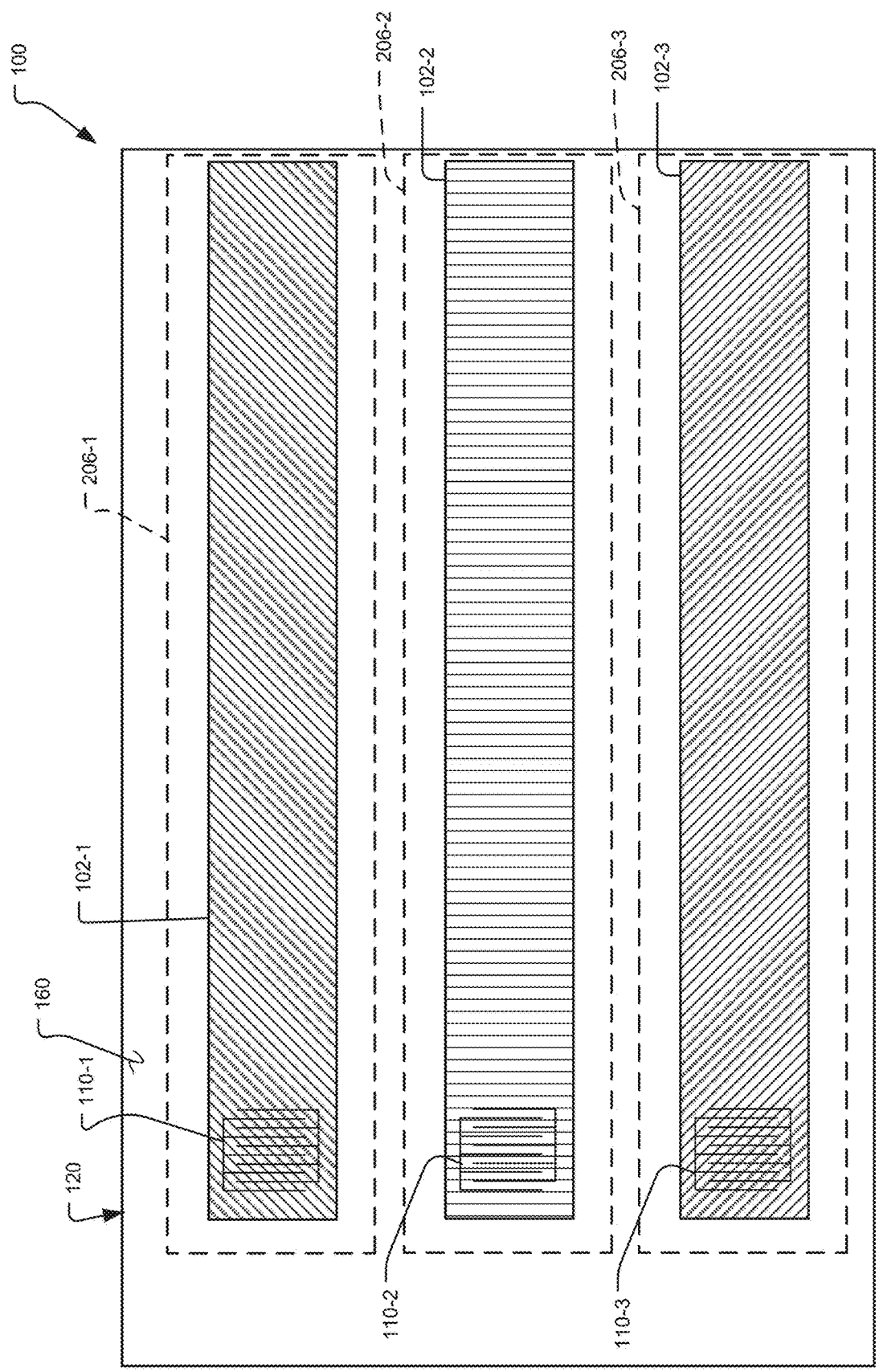
FIG. 5 is a top view of a three channel SAW modulator, where different coating layers are applied over respective waveguides, and where the coating layers are each designed to reflect light at different wavelengths with the desired phase for phase matching.

FIG. 5 shows a top view of another embodiment of a SAW modulator 100. The SAW modulator 100 has three channels, where different coating layers 206-1 through 206-3 of the proximal face 160 are applied on top of waveguides 102-1 through 102-3 formed in a substrate 120 of the SAW modulator 100. The coating layers 206 are each designed to reflect light signals of different wavelengths with the desired phase for phase matching of the leaky mode in each of the waveguides 102. In one example, the waveguides 102-1 through 102-3 are designed to transmit red, green, and blue light, respectively. And the corresponding coating layers 206-1 to 206-3 are designed to reflect the red, green and blue light with the proper phase for constructive interference. In many cases, the coating layers 206-1 to 206-3 will thin film dielectric coating having many layers with slightly different layer thickness to achieve the desired phase relationship for each of the different wavelengths.

FIGS. 6-9 are associated with another embodiment of a SAW modulator 100 that can minimize loss of optical energy and stray light by minimizing effects of undesired diffractive orders and partial internal reflection at the substrate-air boundary.

In the context of maintaining high angular efficiency, the usual Fresnel reflections substrate-air boundary of the exit face are angularly dependent, varying as the light impinges on the boundary at different angles. Therefore, an antireflective (AR) coating on the exit face enables the flux to be angularly invariant or a better approximation of invariant.

Figure 6A:
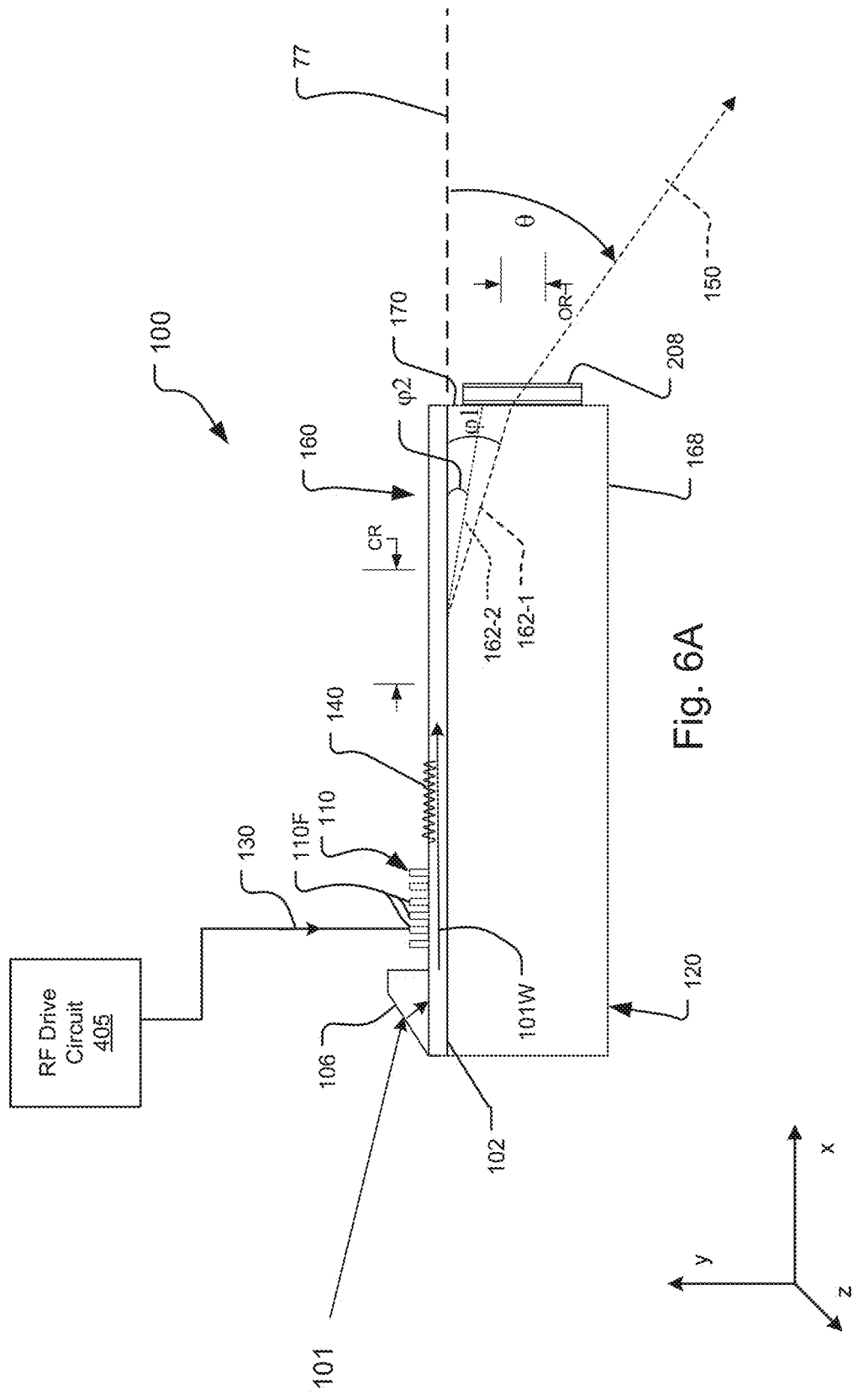
FIG. 6A is a schematic side view of another SAW modulator, where one or more coating layers are applied at an exit, end face of the SAW modulator to suppress unwanted diffractive orders from being transmitted out of substrate at the nominal exit face.

In more detail, FIG. 6A shows another SAW modulator 100 constructed in accordance with principles of the present invention.

By way of background, when the one or more guided modes of the waveguide light 101W interact with the SAW 140, the light signals are diffracted into one or more diffractive orders of the diffracted light. Though multiple diffractive orders can exist, depending on the wave vector of the guided mode and its magnitude compared to the magnitude of the wave vector of the deflected light, other orders may also be forbidden. As a rule, the guided mode must have a smaller wavevector magnitude than the unguided, leaky mode in order for multiple orders to be allowed. In any event, the second diffractive order 162-2, or example, will have a different deflection angle φ2, than the first order 162-1, angle φ1.

When two diffractive orders occur, typically, one of the diffractive orders 162-1, for example, is desirable and the other 162-2 is undesirable (e.g. both +1 and −1 when just one is needed). The light from the unwanted diffractive order 162-2 is diffracted within by the SAW 140 at a deflection angle φ2 relative to grazing 77.

To address the problem of unwanted diffractive orders 162-2, for example, an exit coating 208 such as dual-use AR/HR coating can be applied to an exit face, which is the end face 170 in the illustrated embodiment. When only one diffractive order 162-1 and/or desired, the dual-use AR/HR coating 208 functions as an anti reflective (AR) coating, minimizing internal reflectance of the desired (first order, e.g.) diffractive order 162-1 at the air interface and thus maximizes its transmittance.

When the unwanted second diffractive order 162-2 is present, the exit coating 208 can additionally be tailored to suppress transmission of (e.g. reflect) the second diffractive order 162-2. This can also improve the angles of the exit light.

Figure 6B:
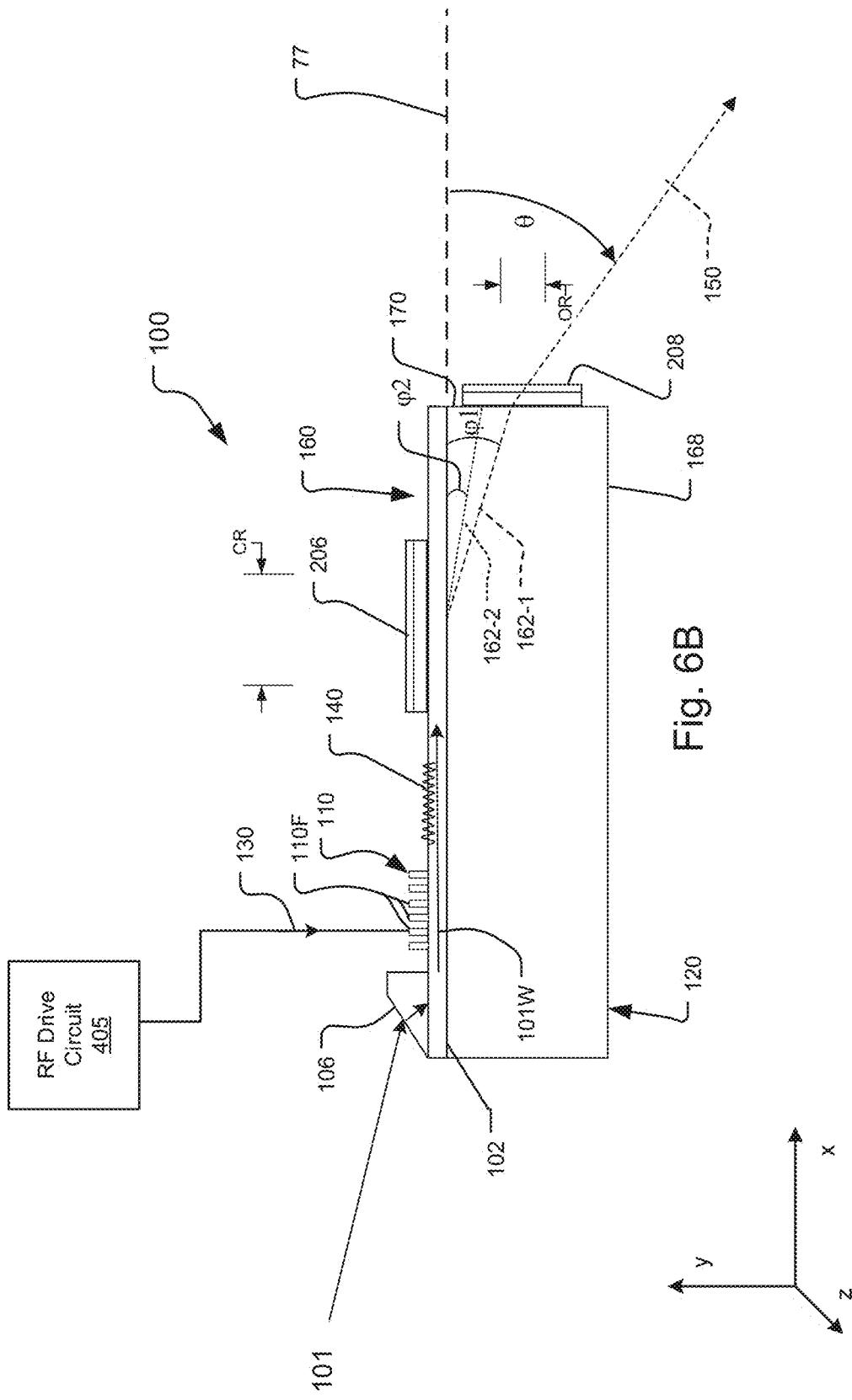
FIG. 6B is a schematic side view of another SAW modulator, where one or more coating layers are applied at the exit along with coating layers on the proximal face to adjust the phase of the leaky modes.

FIG. 6B shows another embodiment of the SAW modulator 100. Here, both a top coating layer 206 as in FIG. 1A and exit coating layer 208 are applied to the substrate 120 in order to increase the range of the deflection angles and the phase relationship between the components of the desired diffractive order. The edge coating layer can be a hybrid AR/HR coating layer, in one example, as previously described.

Figure 7:
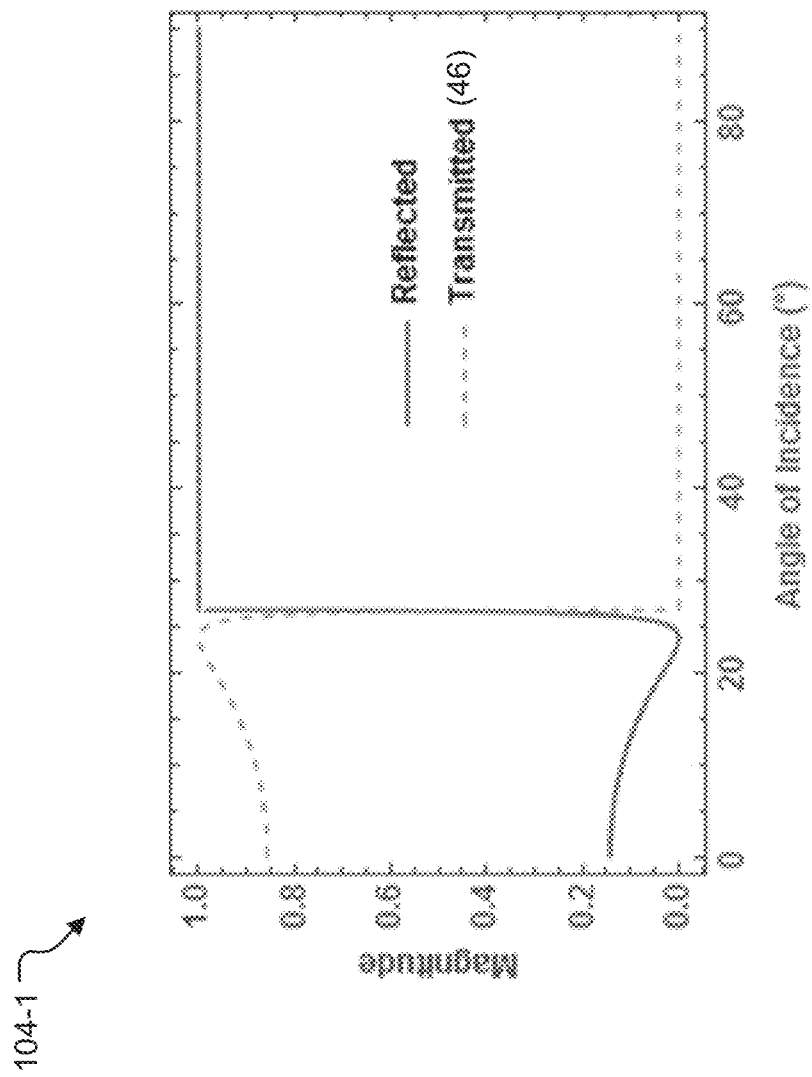
FIG. 7 is a plot of reflectance/transmittance as a function of angle of incidence in degrees for diffracted light when no coatings are applied to the exit face.

FIG. 7 shows a reflectance/transmittance plot for the exit face without any coating. Here, the SAW modulator 100 is formed from an X-cut, Y-propagating lithium niobate substrate 120. The plot is based on a specific geometry of the waveguide 102, crystal orientation within the substrate 120, wavelength of the light signals of the guided mode, and material choices. (It can be coincidentally possible that the undesired mode could be totally internally reflected, thereby removing the necessity for a dual-use AR/HR coating.)

However, in instances where both desired and undesired modes impinge on the surface at angles that can escape the lithium niobite substrate 120, the dual-use AR/HR coating 208 on the exit face functions as an AR coating for the desired diffractive order 162-1 and functions as a high reflectivity (HR) coating for the unwanted diffractive order 162-2 and could be deposited on the exit surface.

Numerous techniques and software packages that utilize finite element analysis, finite difference time domain, analytical transfer functions etc., exist to aid in the design of dual-use AR/HR coating 208. When applying the dual-use AR/HR coating 208 to the exit face 170, the most common method is to apply one or more thin film layers of a dielectric material that form the dual-use AR/HR coating 208.

In addition, dual-use AR/HR coating 208 is preferably designed for a wide range of angles. In practice, one would determine the angular range available due to the leaky mode overlap optimization and available RF bandwidth for the IDT transducers 110, such as the range from 68-76 degrees in FIG. 12. Then this range of angles can be used as the design parameters for a multi-layer AR coating or number of surface patterning techniques to reduce the reflection at the substrate-air optimized to work at the selected angles.

Figure 8:
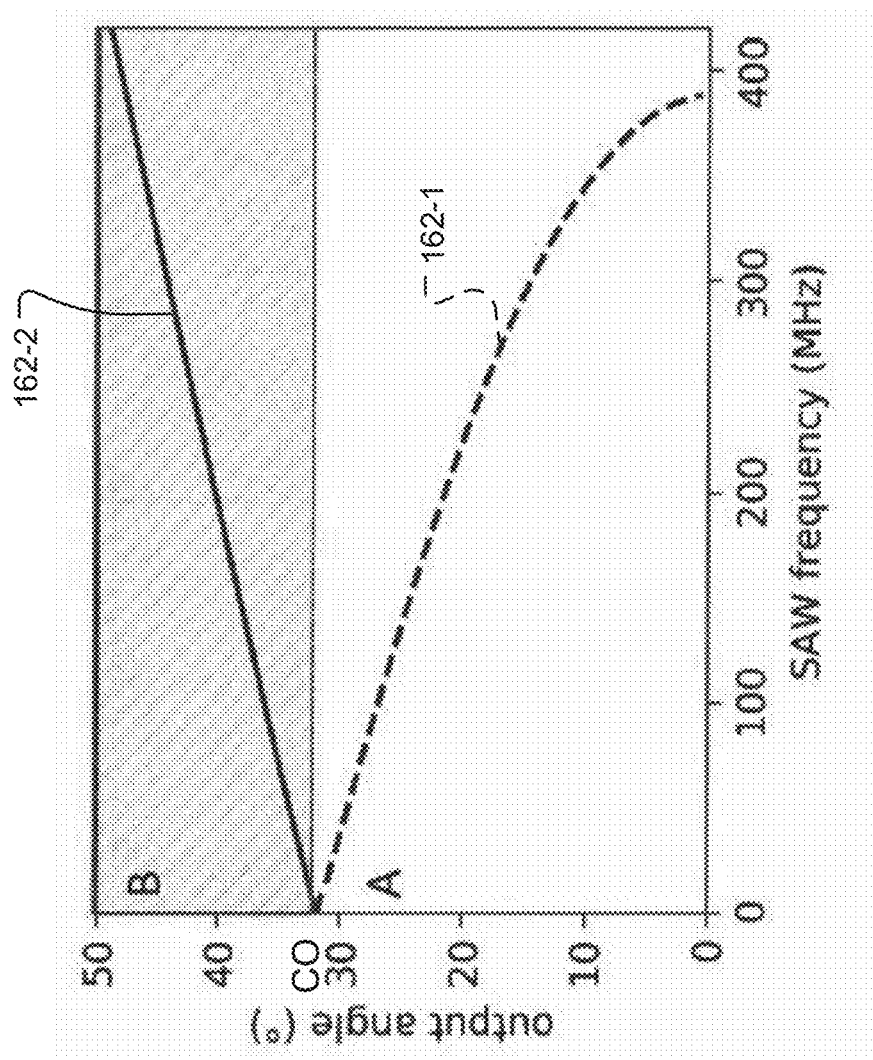
FIG. 8 is a plot of output angle (e.g. the angle of light exiting the substrate) versus SAW frequency for the desired and an unwanted diffractive order.

FIG. 8 shows a plot of multiple diffractive orders 162-1 and 162-2 generated from a guided mode within the SAW modulator 100 of FIGS. 6A and 6B. The diffractive orders 162 manifest as light deflected into two distinct ranges of angles for a given SAW frequency. That is for a crossover angle CO of about 32 degrees, the undesired diffractive orders are at angles greater than the crossover angle and the desired diffractive orders are less than the crossover angle. In some uses of the SAW modulator, this behavior manifests as unwanted cross-talk or noise.

The undesirable diffracted order 162-2 may or may not be deflected efficiently, but in some instances it is a source of noise. This is because as SAWs 140 of a given frequency are applied in order to deflect light to one angle, this can cause the light to be deflected to another angle simultaneously. In these instances, it is preferable to selectively filter the stray or unwanted modulated light of the undesired diffracted order 162-2.

The dual-use AR/HR coating 208 is applied to the substrate 120 of the SAW modulator 100 to suppress transmission of the unwanted diffractive order 162-2 at the exit face, which is the end face 170 in the illustrated example. The exit coating 208 is also tailored to include reflective/transmissive properties that optimally enable the SAW modulator 100 to pass/transmit modulated light signals of the desired diffractive order 162-1. In one example, the exit coating 208 is a hybrid anti-reflective/highly reflective (AR/HR) coating as described in Z. Knittl, "Optics of thin films," Wiley, 1981. In particular, the exit coating 208 is reflective to light at the wavelength operation that strikes the coating at angles associated with undesired diffractive order, such as angles greater than the crossover angle of about 32 degrees. On the other hand, the exit coating 208 is transmissive and antirelective to light at the wavelength operation that strikes the coating at angles associated with desired diffractive order, such as angles less than the crossover angle of about 32 degrees. On other implementations, the cross-over angle CO is about 10 degrees, 20 degrees, or higher such as 40 degrees.

In FIG. 8, the desired diffractive order 162-1 has an angle of incidence at the exit face 170 within a range A, ~0-30 degrees that enables transmission of the diffracted light of the desired diffractive order 162-1 out of the dual-use AR/HR coating 208. The dual-use AR/HR coating 208, however, blocks the transmission of the undesired (second or third) diffractive order 162-2, in one example, by strongly reflecting the passage of the light at the end face 170. The undesired diffractive order 162-2 will have an angle of incidence at the end face 170 within a range B. It is important to note that range A and range B are non-overlapping if a single wavelength of light signals of the guided mode 102 is utilized.

The two diffractive orders 162-1 and 162-2 are in completely separate angular areas of interest. This means that dual-use AR/HR coating 208 can discriminate between the two orders based on their different ranges of angle of incidence.

In examples, preferred characteristics for the dual-use AR/HR coating 208 include: transmitting a ratio of at least 2 to 1 for angles in Region A to Region B. Preferably, however, the dual-use AR/HR coating 208 transmits at a ratio of at least 10 to 1, between the two orders. Yet another preferred coating would have a range of R<0.1% for the entirety of region A and R>99.9% for the entirety of Region B.

The dual-use AR/HR coating 208 is difficult to design for multiple incident wavelengths of light, such as all three primary colors used in a display. If such a design is not feasible, it is preferable to spatially pattern the exit coatings 106 such that a coating for each of the primary colors can be separately applied.

In applications where multiple wavelengths of light are required and a simultaneous optimization of either the phase of reflection (above the waveguides 102), or the reflection as a function of angle (at the exit face) is not possible in a single exit coating 208, spatially patterned coatings can be utilized. The spatially patterned coatings allow the different wavelengths of light to only interact with exit coating 208 that has been optimized for that single wavelength. Standard processing techniques including lithography based "lift-off", or etch based pattern transfer techniques can be used to define regions on the edge or the face of the lithium niobate modulators where different coatings can be placed. Descriptions of these techniques can be found in: M. J. Madou, "Fundamentals of Microfabrication and Nanotechnology," CRC Press, 2011.

Figure 9:
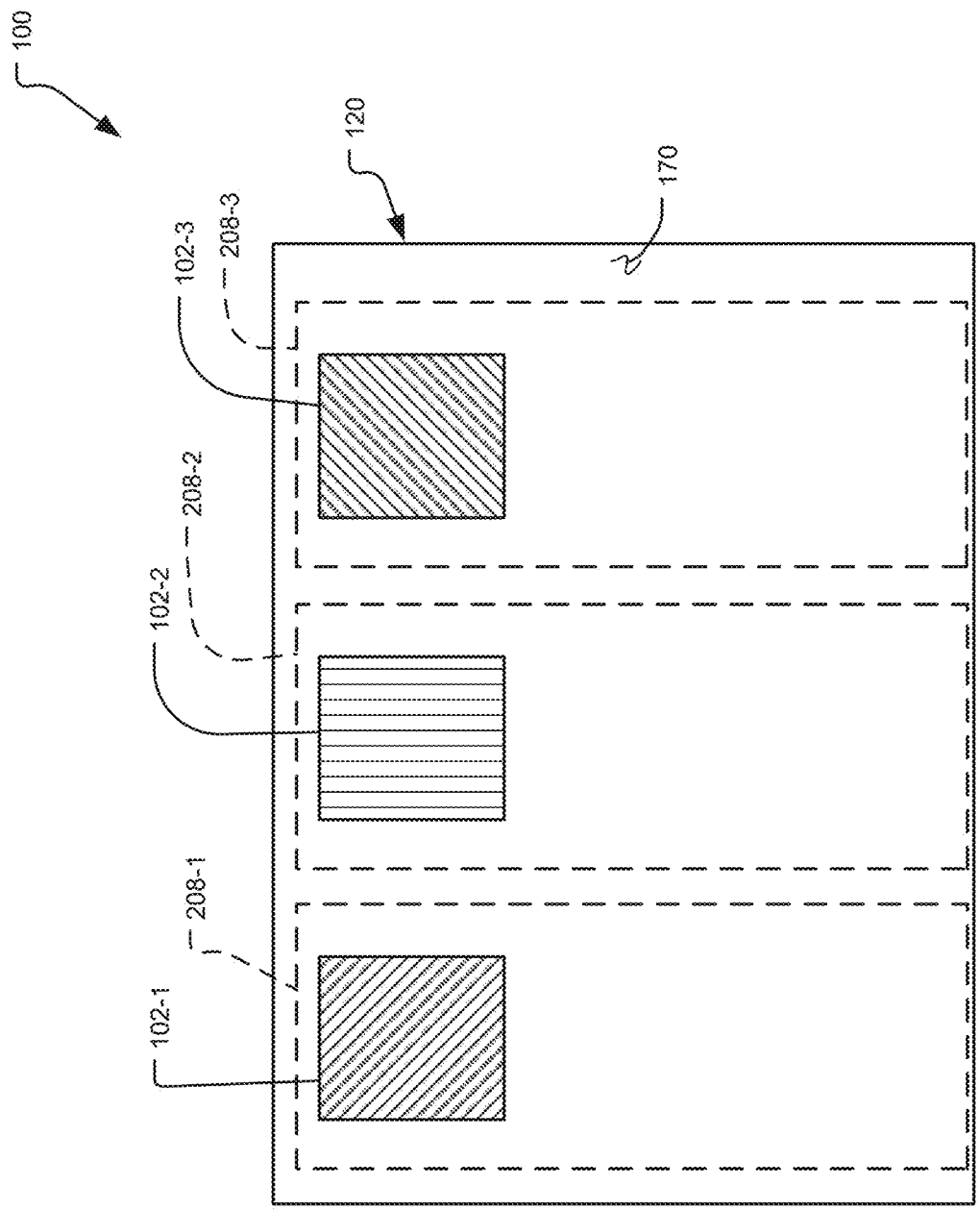
FIG. 9 is a schematic end view of a three channel SAW modulator, where different coating layers are applied at an exit, end face of the SAW substrate for different respective waveguides formed within a substrate, and where the coating layers are each designed to suppress unwanted diffractive orders from being transmitted out of the substrate.

FIG. 9 shows another SAW SLM 32 constructed in accordance with principles of the present invention, as viewed "head-on" looking at its end face 170. The SAW modulator 100 has three channels, each being characterized by a different respective waveguides 102-1, 102-2, 102-3 formed within the SAW substrate 120 of the SAW modulator 100. Each of the waveguides 102 is designed for a different wavelength of light, such as red, green, and blue, respectively. The coating layers 208-1 to 208-3 are each designed to suppress unwanted diffractive orders of the light being transmitted out of the respective waveguides 102.

FIGS. 10-13 are associated with the ability to improve the range of deflection angles φ of diffracted light 162 and thus θ of the exit light 150 signals 46 by improving the transmission efficiency of multiple guided modes propagating within the same SAW modulator 100.

Figure 10B:
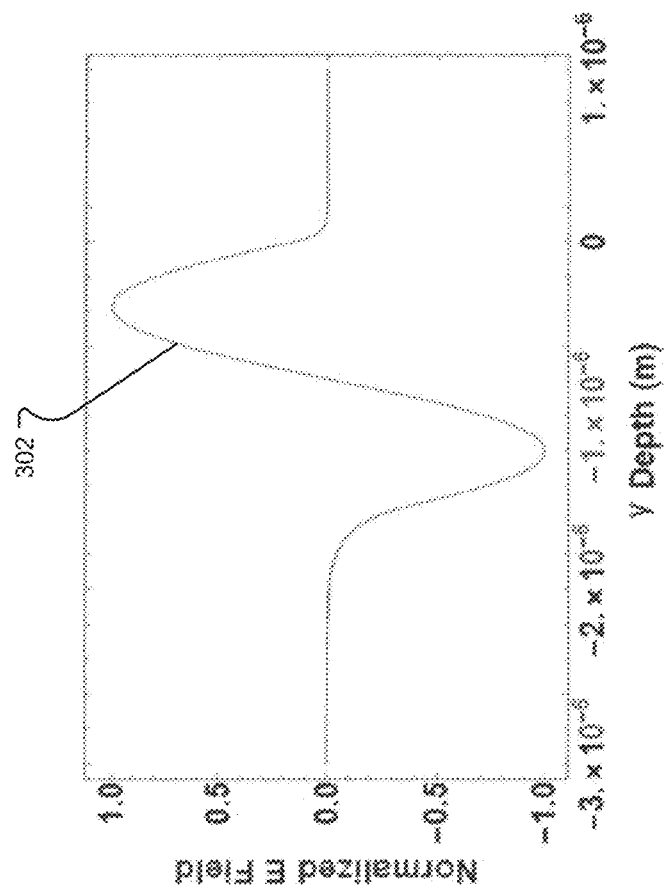
FIGS. 10A and 10B are electric field plots as a function of depth for two different guided modes.
Figure 10A:
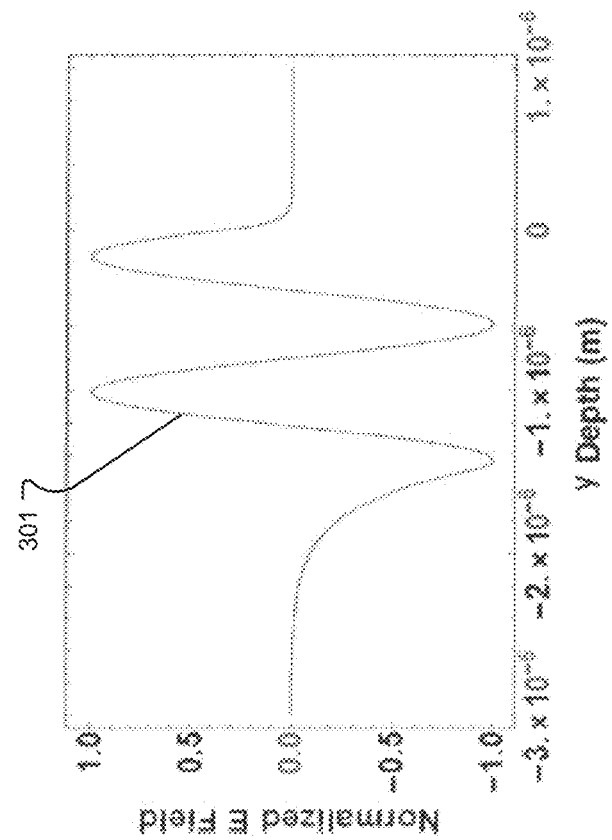

FIGS. 10A and 10B are energy plots for two different guided (transverse) modes of waveguide light 101W, labeled 301 and 302, respectively. The normalized electric (E) field of each guided mode 301/302 is plotted as a function of depth within the waveguide 102 of the SAW modulator 100.

Figure 11:
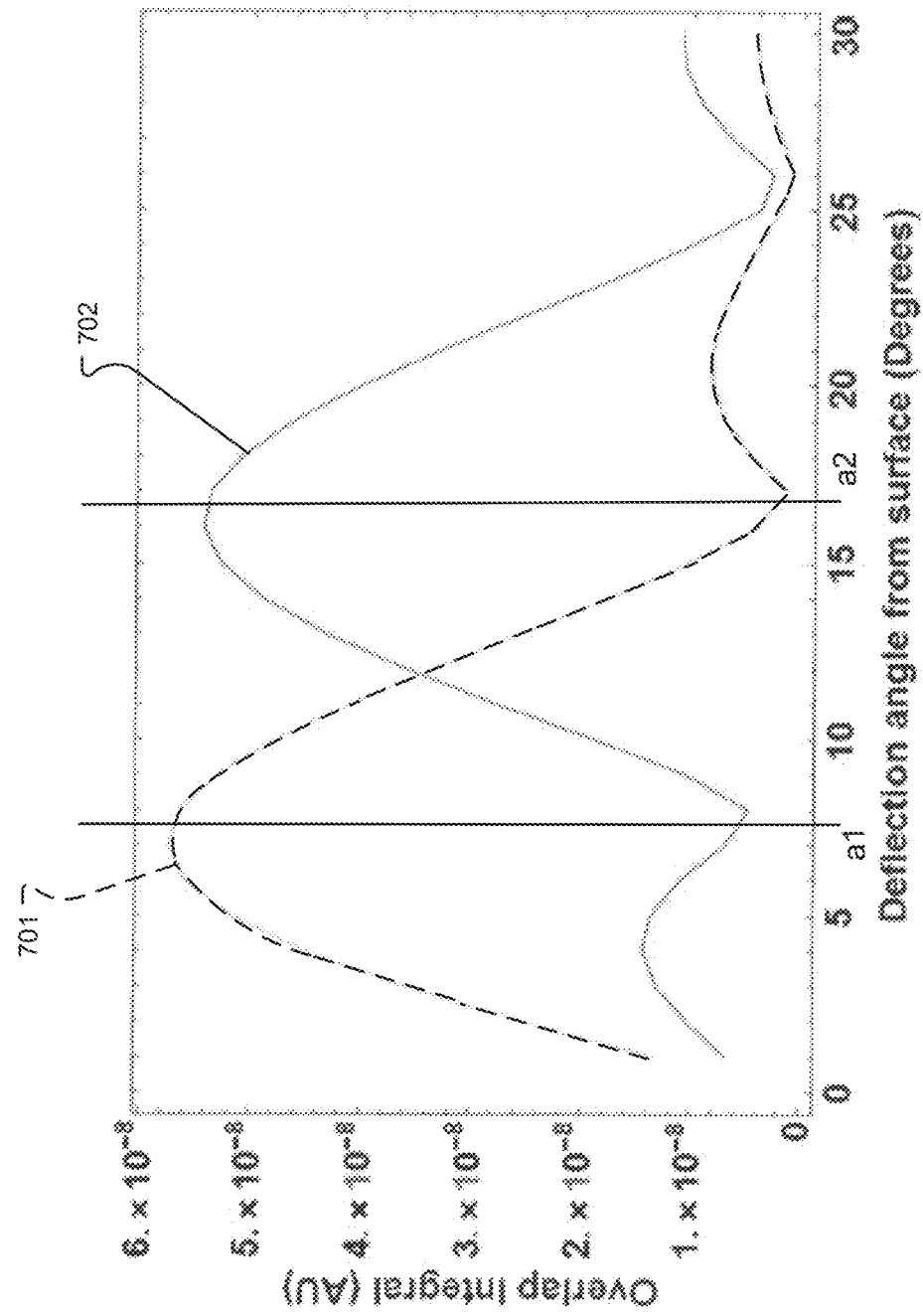
FIG. 11 are plots of response functions plotting the overlap integral for the different guided modes in FIGS. 10A and 10B as a function of deflection angle in degrees.

FIG. 11 shows plots of response functions 701 and 702 for guided modes 301 and 302 in FIGS. 10A and 10B, respectively. The response functions 701/702 show that different guided modes 301/302 of waveguide light 101W of the same wavelength are deflected differently by the SAW 140. The response functions 701/702 plot an overlap integral calculated for each guided mode 301/302 as a function of the exit angle θ, where the exit angle is measured from the substrate-air boundary at the exit face. The overlap integral for each guided mode is a measure of the strength of the coupling between the SAW 140 and the waveguide light 101W of each guided mode.

By applying one or more coating layers to the SAW modulator as in FIG. 1A, the one or more of the multiple guided modes 301/302 can be adjusted to optimize overlapping areas of the response functions of the guided modes. This optimization enables one of the guided modes to have a smaller response for a given SAW frequency than another guided mode, which can limit cross-talk among the different guided modes and thereby can increase the range of the deflection angles.

For example, with reference to FIG. 11, the coating layer 206 is applied to the SAW modulator 100 that shifts the phase of the guided modes 301/302 and therefore the phase of their corresponding response functions 701/702. In one example, guided mode 301 has a maximum value for its overlap integral at deflection angle α1, while guided mode 302 has a minimum, near-zero value for its overlap integral at the same deflection angle α1. In a similar fashion, guided mode 302 has a maximum value for its overlap integral at deflection angle α2, while guided mode 301 has a minimum, near-zero value for its overlap integral at the same deflection angle α2.

Figure 13:
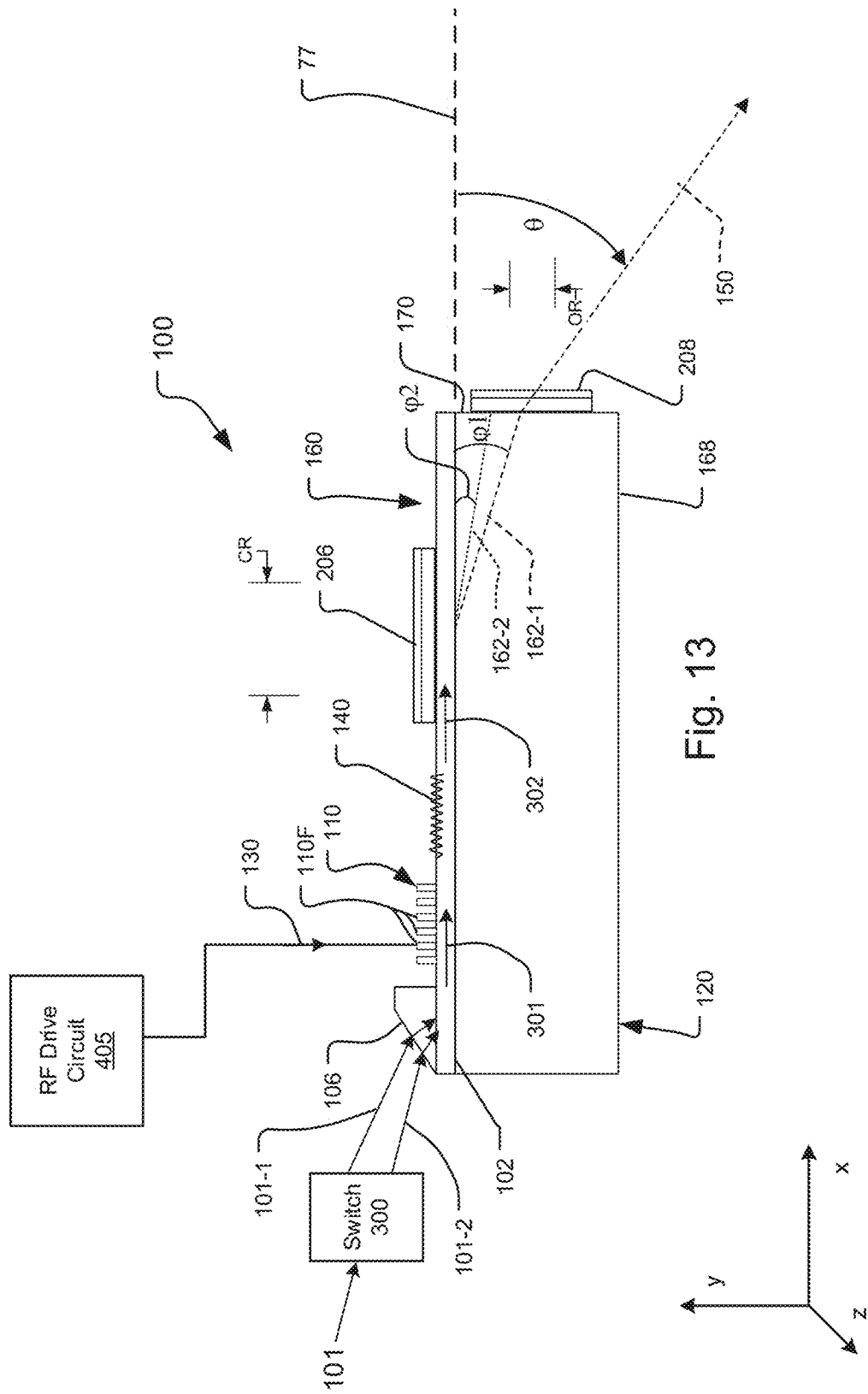
FIG. 13 is a schematic side view of an exemplary SAW modulator including a switch providing multiple input channels to excite different guided modes of the waveguide.

FIG. 13 shows a SAW modulator that individually excites different guided modes of the waveguide 102.

In more detail, input light 101, such as from a visible light laser, is provided to an optical switch 300 that transmits light in two channels or beams 101-1 or 101-2 to the in-coupling device, which is prism 106 in the illustrated embodiment. The angles of each of the beams 101-1 or 101-2 are chosen to respectively excite either of two guided modes 301 and 302 of waveguide 102.

In one embodiment, the switch 300 controlled such that only one of the guided modes 301 and 302 is excited in the waveguide 102 at any given instance, thereby removing crosstalk among the guided modes 301/302. For this purpose, in one example, if light is being launched into the waveguide 102 into two different guided modes 301/302, there are the two input channels corresponding to each propagating mode, which is provided by the operation of the switch 300. Time dependent control of the switch 300 is then used to turn the channels on independently. The display formed from the exit modulated light signals 150 would then be operated in a switched regime.

In the switched regime, when one output angle corresponding to the first mode 301 is required, the first channel 101-1 is turned on by switch 300, and the second channel 101-2 is turned off. The frequency of the RF signals 15 appropriate for the desired angle is generated, to thereby launch the SAW of the appropriate frequency for mode 301. When a different angle is required, which can be efficiently addressed from the second mode 302, the first channel 101-1 is turned off while the second channel 102-2 is turned on and the appropriate RF frequency of the RF signals 130 is delivered for this second angle. For this purpose, the switch 300 employs switching technology such as an acousto-optic or liquid-crystal modulator can be operated much faster than the eye can discern allowing for seamless image generation.

Figure 12B:
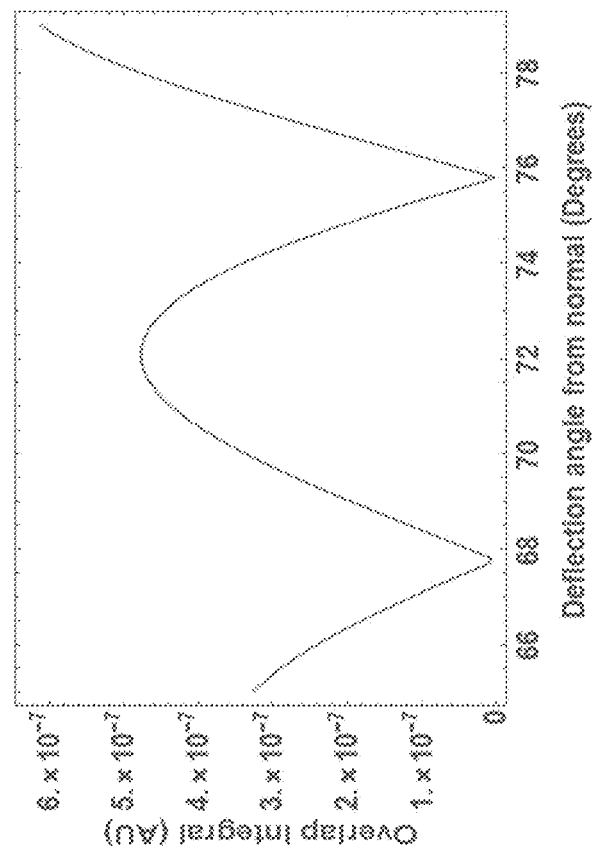
FIGS. 12A and 12B shows plots of angular efficiency of the guided mode in FIG. 10A, without and with the top-coating applied, respectively.
Figure 12A:
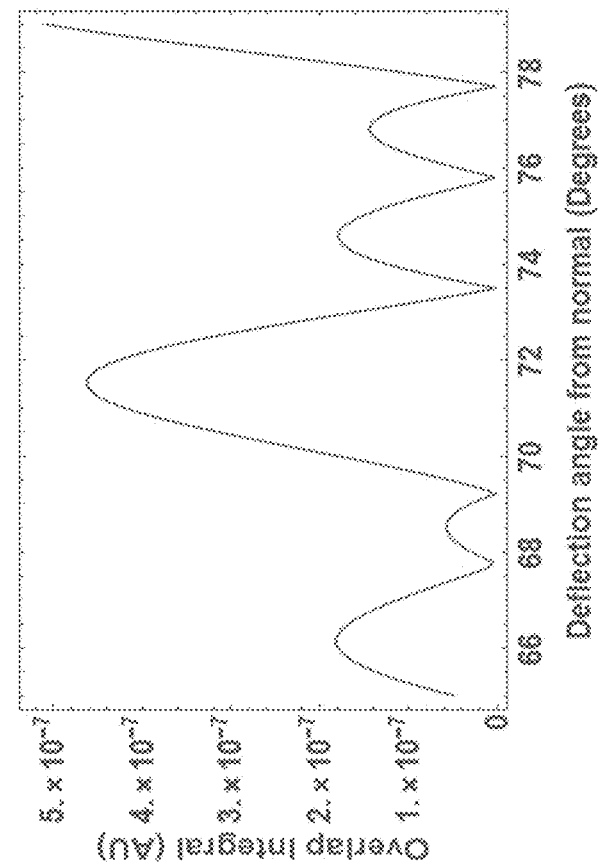

FIGS. 12A and 12B shows plots of angular efficiency for the guided modes 301, with FIG. 12A having and FIG. 12B lacking an idealized reflection phase at the air-lithium niobate boundary of the exit face, respectively. The angular efficiency is plotted as a function of deflection angle from normal. The angular efficiency in the plots is expressed along the vertical axis as an overlap integral, which provides a measure of how strong the coupling is between the light signals of a guided mode and the deflection angle of the exit light emitted from the SAW modulator 100.

In one example, when designing the SAW modulator 100 to transmit multiple guided modes 301, 302, the coating layer 206 is applied to proximal face 160 of the SAW modulator 100 in conjunction with an exit layer coating 306 applied to the exit face. The top coating layer 206 is tailored to not only optimize coupling of the leaky modes produced in the SAW modulator 100 for one or more guided modes of waveguide light 101W, but can also be tailored to adjust the phase in the response functions of the guided modes to provide maximum overlap of the guided modes. The exit coating 306, in turn, can suppress any unwanted diffractive orders of the guided modes from being transmitted out of the substrate 120. In another example, a top layer coating 206, an exit coating 306, and an edge coating 306 can all be applied to the same SAW modulator 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surface acoustic wave (SAW) modulator, including:
a SAW substrate;
a waveguide in the SAW substrate; and
one or more coating layers that are applied to a face of the SAW substrate to improve coupling of guided modes of the waveguide into leaky modes to adjust a phase of one or more plane waves forming the leaky modes to provide improved coupling of the guided modes to the leaky modes over a range of angles.

2. A modulator as claimed in claim 1, wherein the one or more coating layers are applied to a proximal face of the SAW substrate and over the waveguide.

3. A modulator as claimed in claim 1, wherein the one or more coating layers are applied to an end face of the SAW substrate.

4. A modulator as claimed in claim 1, wherein the one or more coating layers are reflective layers.

5. A modulator as claimed in claim 1, wherein the one or more coating layers are transmissive layers.

6. A modulator as claimed in claim 1, wherein the one or more coating layers include at least one metal layer.

7. A modulator as claimed in claim 1, wherein the one or more coating layers include a multilayer thin film dielectric coating.

8. A modulator as claimed in claim 7, wherein a thickness of layers of the multilayer thin film dielectric coating is sized to a wavelength of light coupled into the waveguide.

9. A modulator as claimed in claim 1, wherein the waveguide is a buried waveguide.

10. A modulator as claimed in claim 1, further comprising coating layers that are applied to both a proximal face and an end face of the SAW substrate.

11. A modulator as claimed in claim 1, further comprising an interdigital transducer on the substrate for generating a surface acoustic wave that polarization-rotates the guided modes into the leaky modes.

12. A modulator as claimed in claim 1, wherein the SAW substrate includes lithium niobate.

13. A modulator as claimed in claim 1, wherein coupling of the guided modes into the leaky modes is improved by the one or more coating layers, which are located above the waveguide, causing constructive interference between upward deflected waves and downward deflected waves of the leaky modes.

14. A modulator as claimed in claim 1, wherein the one or more coating layers are applied over the waveguide and in a conversion region in which the guided modes of the waveguide are converted into the leaky modes, the conversion region being partway between an input face and an end face.

15. A multichannel surface acoustic wave (SAW) modulator, including:
a SAW substrate;
two or more waveguides in the SAW substrate; and
different coating layers applied to a face of the SAW substrate for each of the waveguides to improve coupling of guided modes of the waveguide into leaky modes,
wherein each of the coating layers adjusts a phase of one or more plane waves forming the leaky modes to provide improved coupling of the guided modes to the leaky modes over a range of angles.

16. A modulator as claimed in claim 15, further comprising interdigital transducers on the substrate for generating surface acoustic waves that polarization-rotate the guided modes into the leaky modes.

17. A modulator as claimed in claim 15, wherein the SAW substrate includes lithium niobate.

18. A modulator as claimed in claim 15, wherein coupling of the guided modes into the leaky modes is improved by the one or more coating layers causing constructive interference between upward deflected waves and downward deflected waves of the leaky modes.

19. A modulator as claimed in claim 15, wherein the one or more coating layers are applied to a conversion region in which the guided modes of the waveguides are converted into the leaky modes, the conversion region being partway between an input face and an end face.

20. A method for fabricating a surface acoustic wave (SAW) modulator, the method comprising:
forming a waveguide in a SAW substrate; and
depositing one or more coating layers that are applied to a face of the SAW substrate to improve coupling of guided modes of the waveguide into leaky modes by adjusting a phase of one or more plane waves forming the leaky modes to provide improved coupling of the guided modes to the leaky modes over a range of angles.

* * * * *